(12) United States Patent
Mentgen et al.

(10) Patent No.: US 7,164,256 B2
(45) Date of Patent: Jan. 16, 2007

(54) METHOD AND DEVICE FOR DETERMINING AVAILABLE ELECTRIC POWER IN AN INSTRUMENT PANEL

(75) Inventors: Dirk Mentgen, Schwieberdingen (DE); Frank Buchholz, Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 10/450,290

(22) PCT Filed: Apr. 10, 2002

(86) PCT No.: PCT/DE02/03768

§ 371 (c)(1),
(2), (4) Date: Oct. 23, 2003

(87) PCT Pub. No.: WO03/033308

PCT Pub. Date: Apr. 24, 2003

(65) Prior Publication Data

US 2004/0061475 A1    Apr. 1, 2004

(30) Foreign Application Priority Data

Oct. 11, 2001 (DE) .............................. 101 50 378

(51) Int. Cl.
*H02J 7/00* (2006.01)
*G01N 27/416* (2006.01)

(52) U.S. Cl. ..................... 320/132; 320/104; 324/427

(58) Field of Classification Search ............... 320/104, 320/132, 134, 135, 136; 324/425–427, 431, 324/433
See application file for complete search history.

(56) References Cited

U.S. PATENT DOCUMENTS

| 5,598,088 A * | 1/1997 | Richter .................... 320/134 |
| 6,301,528 B1 * | 10/2001 | Bertram et al. ............... 701/1 |
| 6,679,344 B1 * | 1/2004 | Bertram et al. ........... 180/65.3 |
| 2002/0130637 A1 * | 9/2002 | Schoch .................... 320/132 |

FOREIGN PATENT DOCUMENTS

| DE | 198 29 150 | 1/2000 |
| DE | 199 20 842 | 4/2000 |
| DE | 198 57 916 | 6/2000 |
| DE | 101 06 508 | 8/2002 |

* cited by examiner

*Primary Examiner*—Karl Easthom
*Assistant Examiner*—Aaron Piggush
(74) *Attorney, Agent, or Firm*—Kenyon & Kenyon LLP

(57) ABSTRACT

The present invention relates to a method and a device for ascertaining the electric power, provided by a battery and a generator, available in a motor-vehicle electrical system. To determine the available electric power, both a battery model and a generator model are provided, from which the battery reserve power and the generator reserve power may be ascertained. The total power available in the vehicle electrical system is finally determined from the battery reserve power and the generator reserve power.

14 Claims, 2 Drawing Sheets

METHOD AND DEVICE FOR DETERMINING AVAILABLE ELECTRIC POWER IN AN INSTRUMENT PANEL

FIELD OF THE INVENTION

The present invention relates to a method and a device for ascertaining the power, provided by a battery and a generator, available in an energy supply system, particularly a vehicle electrical system.

BACKGROUND INFORMATION

The power requirement of electrical loads in motor vehicles is rising sharply due to the increasing number of comfort and convenience loads and the electrification of auxiliary systems. In certain operating states, the electric power made available by the generator may no longer be sufficient to cover the entire power requirement. To be able to initiate selective measures within the framework of an electrical energy and load management, information may be required concerning the instantaneous relationship of power supply and demand.

When using safety-critical electrical loads, such as electromechanical brakes (EMB), in a motor-vehicle electrical system, the energy supply of this system must be monitored constantly in order to be able to recognize a malfunction in a timely manner and initiate countermeasures. For this purpose, modern vehicle electrical systems may include an energy and electrical load management system, by which it may be possible to check the vehicle battery regarding its state of health prior to switching on a load. If there is danger of exceeding certain load limits of the battery, either measures may be carried out for improving the state of health of the battery, for example, by increasing the charging voltage, or measures may be carried out for reducing the battery load, particularly the switching-off or dimming of electrical loads.

A motor-vehicle electrical system may be supplied by a battery and, when the engine is running, by a generator. The load capacity or state of health of a vehicle battery may be assessed using suitable battery models, making it possible to ascertain whether certain electrical loads may be switched on, or whether load-reducing measures must be initiated to prevent a failure of safety-critical devices. Such a battery model is described, for example, in DE-P 101 065 08.6. However, in that case, the power made available by the generator is not taken into account.

It may be that the degree of generator utilization may be ascertained via a so-called DF-signal (control signal by which the excitation of the generator is activated or deactivated). However, in this context, a conclusion about the instantaneous power output, and, above all, the instantaneous power reserve of the generator is not possible, since the power output of the generator is strongly dependent on the specific operating state (temperature, voltage, rotational speed, capacity utilization).

SUMMARY

An exemplary embodiment of the present invention provides a method and a device which may make it possible to more precisely determine the power available from the generator, in order to use this information for an optimum energy and electrical load management.

An exemplary embodiment of the present invention may ascertain the electric power, provided by a battery and a generator, available in a motor-vehicle electrical system, not only by evaluating a battery model, but in addition may set up a generator model with which the reserve power available from the generator may be exactly calculated. The reserve powers ascertained from the battery model and the generator model may be finally balanced in order to calculate the reserve power available, or a power deficit, in the vehicle electrical system.

The generator model may be implemented both as software and as hardware (circuit). According to an exemplary embodiment of the present invention, the generator model may be supplied with the generator voltage, the generator speed and the generator temperature or variables from which the previously indicated parameters may be derived (such as the coolant temperature from which it is possible to estimate the generator temperature). By using the generator model, it may be possible to ascertain the instantaneously available electric power and the power reserve of the generator as a function of the operating state (voltage, speed, temperature, capacity utilization) of the generator.

The generator model may be a program in which generator characteristic curves are stored which represent the profile of the generator voltage or output power as a function of specific operating parameters.

The information about the reserve power available in the vehicle electrical system, obtained from the power balancing, may be used for an electrical load management. For example, load limits of the battery and/or generator may be predefined which are not to be exceeded when switching on an electrical load.

The reaction (voltage drop, increase in capacity utilization) of the battery or of the generator to be expected when switching on a defined electrical load may be predicted, for instance, using a suitable model. To that end, for example, the model may compare a predefined maximum degree of utilization to the degree of utilization to be expected after switching on an electrical load. Such a comparison permits a clear statement about whether or not the battery or the generator is able to provide a minimum voltage required for the reliable operation of the electrical load in question.

The load of the battery or of the generator may be limited by steps, that is to say, different load limits may be predefined which are valid for different electrical loads. For example, provision may be made in the electrical load management (control unit with management program) that, above a predefined loading of the vehicle electrical system, only certain electrical loads may be switched on, but others not.

If the predefined load limits are exceeded, countermeasures may preferably be initiated. Upon recognition of a power deficit, stabilization measures such as increasing the idling speed of the engine may be carried out, or the switch-off or dimming of electrical loads may be initiated.

According to an exemplary embodiment of the present invention, the exceeding of the predefined limiting values may be displayed.

Given sufficient power reserve in the vehicle electrical system, the power surplus may be used for a battery thermomanagement, that is, the battery may be heated, thereby exhibiting better charging performance.

According to an exemplary embodiment of the present invention, the battery model may be supplied with battery measured values, particularly the battery voltage or the current delivered by the battery, in light of which the model parameters taken as a basis in the battery model may be adapted in the event of deviations. In this manner, the battery model may dynamically follow the instantaneous state of the battery which, as is known, may steadily deteriorate during its service life.

In a similar manner, generator measured values, particularly the generator voltage, the generator speed and/or the generator temperature may also be supplied to the generator model used. However, in contrast to the battery model, the generator model may preferably be static. The characteristic curves underlying the generator model, which were ascertained by test stand measurements as a function of temperature, load, etc., may preferably not be changed.

According an exemplary embodiment of the present invention, the generator voltage may be estimated up to a predefined degree of utilization of the generator. Only as of a predefined degree of utilization of, for example, 90% (which may be obtained via the DF signal) may the generator voltage be calculated from the battery voltage and a voltage dropping on the connection line to the battery.

DETAILED DESCRIPTION

Figure 1:
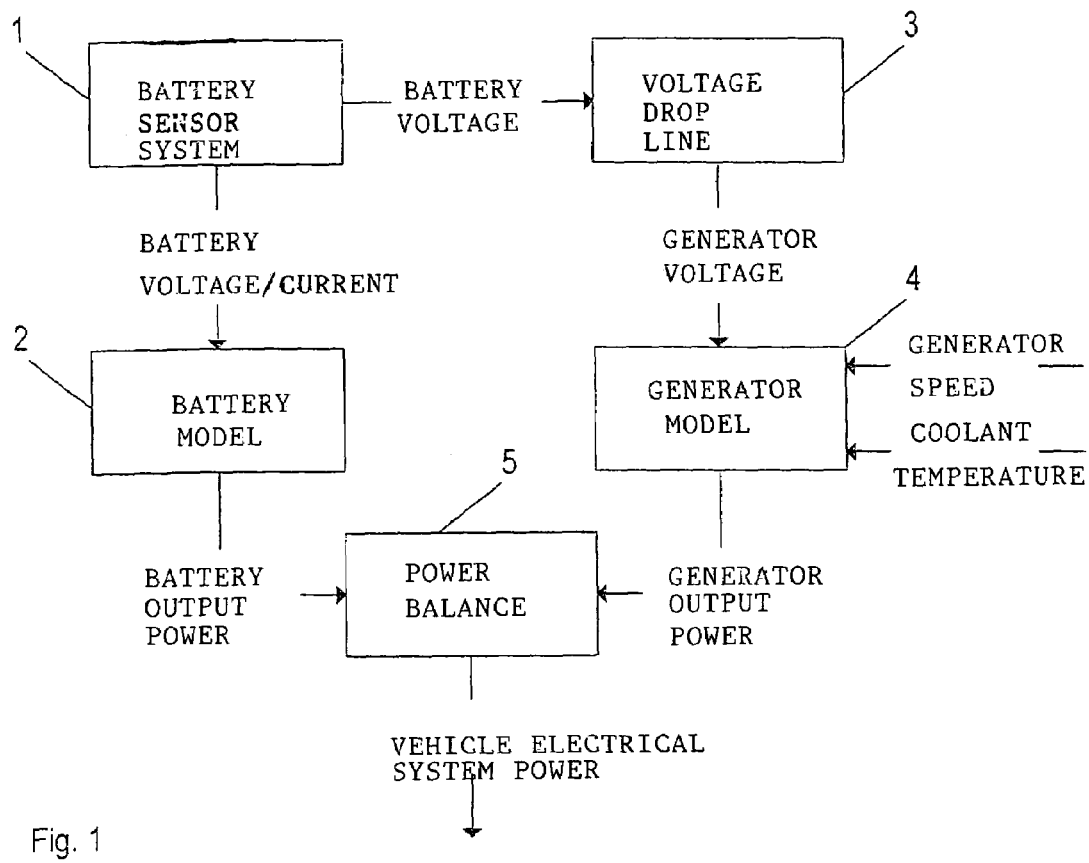
FIG. 1 shows a schematic block diagram of a system for ascertaining the total reserve power available in a vehicle electrical system.

FIG. 1 shows a schematic circuit diagram of a configuration for ascertaining the power available in a vehicle electrical system, whose central components are a battery model 2 and a generator model 4. The battery and generator models may be implemented as software in a data-processing device.

Battery measured values, particularly the battery voltage or the battery current measured by a battery sensor system 1, may be supplied to battery model 2. From these inputs, the state of charge and the state of health of the battery may be ascertained. From this, in turn, it may be possible to determine whether a load of the battery, which would result by switching on a specific electrical load, a predefined load limit such as a voltage limit $U_{limit}$ would be undershot. In this context, the voltage limits may be set in such a way that the operation of safety-relevant devices is not jeopardized.

The voltage limits may be modified upon detection of a decline in the battery state of health, e.g., due to battery ageing.

The battery reserve power $\Delta P_{battery}$ may be ascertained from the maximum load current the battery is able to cause to flow until reaching a load limit $U_{limit}$, and from the instantaneous battery internal resistance $R_{battery}$.

Figure 3:
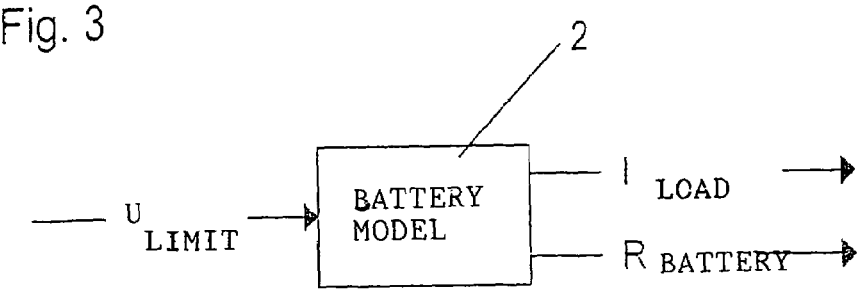
FIG. 3 shows a functional circuit diagram of a battery model.

FIG. 3 shows a battery model having battery-state sensing. A voltage limit $U_{limit}$ may be predefined for the battery model, from which it ascertains the current $I_{load}$ deliverable until reaching voltage limit $U_{limit}$, as well as the battery internal resistance $R_{battery}$. Applicable for the battery reserve power $\Delta P_{battery}$ is:

$$\Delta P_{battery} = I^2_{load} * R_{battery}.$$

The reserve power $\Delta P_{generator}$ available from the generator may be ascertained as follows (see FIGS. 1 and 2): First of all, generator model 4 ascertains the instantaneous maximum generator output power $P_{generatormax}$.

Figure 2:
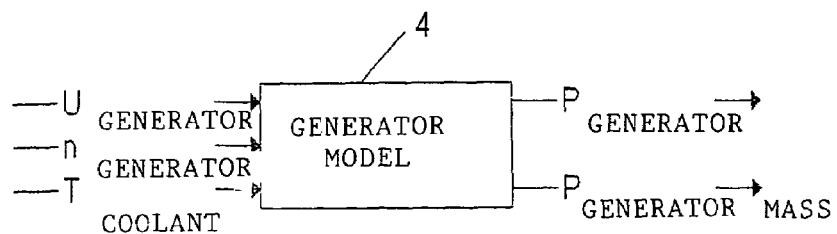
FIG. 2 shows a functional circuit diagram of a generator model.

The input quantities of generator model 4 of FIG. 2 are generator voltage $U_{generator}$, generator speed $n_{generator}$ (which is in a fixed ratio to the engine speed) and generator coolant temperature $T_{coolant}$ (which is in a fixed ratio to the generator temperature).

Generator voltage $U_{generator}$ may be calculated on the basis of a voltage drop $\Delta U_{line}$ on connection line 3 between the battery and generator, and from the battery voltage. The following applies:

$$U_{generator} = U_{battery} + \Delta U_{line}. \tag{1}$$

From this, generator model 4 ascertains instantaneous generator output power $P_{generator}$. For the generator reserve power $\Delta P_{generator}$ available from the generator, the following may hold true:

$$\Delta P_{generator} = P_{generatormax} - P_{generator}.$$

The total reserve power available in the system or a power deficit may be ascertained (in a processing unit) with the aid of a power balance 5. For the instantaneous total power surplus or power deficit in the vehicle electrical system $\Delta P_{vehicle\ electrical\ system}$, the following may hold true:

$$\Delta P_{vehicle\ electrical\ system} = \Delta P_{battery} + \Delta P_{generator}.$$

Figure 4:
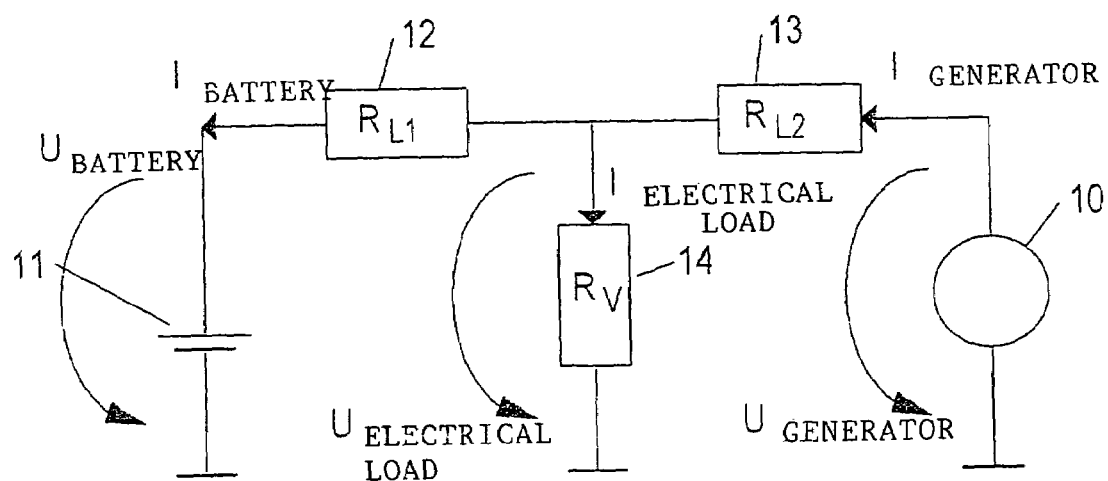
FIG. 4 shows a simplified equivalent circuit diagram for a vehicle electrical system.

An alternative possibility for ascertaining the generator output power may be to determine the generator voltage $U_{generator}$ from the battery voltage $U_{battery}$, the battery current $I_{battery}$ and the electrical load requirements $P_{electrical\ load}$. A suitable sensor system may be necessary to ascertain the battery voltage $U_{battery}$ and battery current $I_{battery}$. Electrical load requirements $P_{electrical\ load}$ may be determined on the basis of the electrical-load state (on/off) and known electrical-load-requirement parameters. A simplified equivalent circuit diagram of the vehicle electrical system is shown in FIG. 4.

Generator 10 may be connected via a connection line 13 to an electrical load 14 having a resistance $R_v$, and via a further line 12 to a battery 11. The following equations may be formulated for ascertaining generator voltage $U_{generator}$:

$$U_{generator} = I_{generator} * R_{L2} + U_{electrical\ load},$$

$$I_{generator} = I_{battery} + I_{electrical\ load},$$

$$I_{electrical\ load} = P_{electrical\ load} / (I_{battery} * R_{L1} + U_{battery});$$
and $$U_{electrical\ load} = I_{battery} * R_{L1} + U_{battery}.$$

The generator voltage ascertained in this manner may be used instead of estimation (1) as input quantity for generator model 4 of FIG. 2.

This exemplary method may entail a relatively high parameterization expenditure for the individual electrical load parameters, which in addition, may be a function of the degree to which the vehicle is outfitted.

What is claimed is:

1. A method for ascertaining electric power provided by a battery and a generator, available in an energy supply system, comprising:
ascertaining a battery reserve power in accordance with a battery model, wherein the battery model is implemented as one of a software program stored on a storage medium and a hardware circuit;
ascertaining a generator reserve power in accordance with a generator model, wherein the generator model is implemented as one of a software program stored on a storage medium and a hardware circuit;

calculating a total available reserve power from the battery reserve power and the generator reserve power;

receiving, as input quantities, by the generator model one of:
- a generator voltage, a generator speed, and a generator temperature; and
- a plurality of quantities from which the generator voltage, the generator speed, and the generator temperature are derivable;

up to a predefined degree of utilization of the generator, estimating a generator voltage supplied to the generator model; and above the predefined degree of utilization, calculating the generator voltage from a battery voltage and a voltage drop on a connection line, wherein the calculating involves a different methodology than the estimating;

wherein a plurality of predefined limiting values are definable for a first load of the energy supply system, and wherein, if one of the plurality of predefined limiting values is undershot, one of dimming and switching off at least one predefined electrical load.

2. The method of claim 1, further comprising adapting the battery model to an instantaneous state of the battery in accordance with a plurality of battery measured values acquired by a battery sensor system.

3. The method of claim 1, wherein the generator model is static.

4. The method of claim 1, wherein the battery model includes a battery-state recognition, with which a state of health of the battery is assessable.

5. The method of claim 1, further comprising utilizing information about an available power in the energy supply system for an electrical-load management of a plurality of electrical loads connected in the energy supply system.

6. The method of claim 1, further comprising initiating a plurality of measures for reducing energy consumption if one of the plurality of predefined limiting values is one of undershot and threatens to be undershot.

7. The method of claim 1, further comprising displaying undershooting of one of the plurality of predefined limiting values.

8. The method of claim 1, wherein an electrical load is switchable on only if there is a sufficient reserve power.

9. The method of claim 1, further comprising utilizing power reserves provided by the energy supply system for a battery thermomanagement.

10. The method of claim 1, wherein the energy supply system includes a vehicle electrical system.

11. The method of claim 1, wherein the plurality of predefined limiting values are definable for one of a second load of the battery and a third load of the generator.

12. A device for ascertaining electric power provided by a battery and a generator available in an energy supply system, comprising:

a processing unit including:
- a battery model adapted to ascertain a first reserve power available from the battery, wherein the battery model is implemented as one of a software program stored on a storage medium and a hardware circuit; and
- a generator model adapted to ascertain a second reserve power available from the generator, wherein the generator model is implemented as one of a software program stored on a storage medium and a hardware circuit; wherein:

the processing unit is configured to calculate a total reserve power available in the energy supply system from the first reserve power and the second reserve power;

the generator model receives, as input quantities, one of:
- a generator or voltage, a generator speed, and a generator temperature; and
- a plurality of quantities from which the generator voltage, the generator speed and the generator temperature are derivable;

up to a predefined degree of utilization of the generator, the processing unit is configured to estimate a generator voltage supplied to the generator model;

above the predefined degree of utilization, the processing unit is configured to calculate the generator voltage from a battery voltage and a voltage drop on a connection line, the calculating involving a different methodology than the estimating; and a plurality of predefined limiting values are definable for a first load of the energy supply system, and if one of the plurality of predefined limiting values is undershot, one of dimming and switching off at least one predefined electrical load is performed.

13. The device of claim 12, further comprising a battery sensor system configured to ascertain a battery current and a battery voltage.

14. The device of claim 12, wherein the energy supply system includes a vehicle electrical system.

* * * * *